(12) United States Patent
Sakata et al.

(10) Patent No.: US 12,337,760 B2
(45) Date of Patent: Jun. 24, 2025

(54) DISPLAY CONTROL DEVICE AND DISPLAY CONTROL METHOD

(71) Applicant: Faurecia Clarion Electronics Co., Ltd., Saitama (JP)

(72) Inventors: Naoto Sakata, Saitama (JP); Tetsuro Murakami, Saitama (JP); Masashi Koga, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 58 days.

(21) Appl. No.: 18/526,625

(22) Filed: Dec. 1, 2023

(65) Prior Publication Data

US 2024/0208415 A1 Jun. 27, 2024

(30) Foreign Application Priority Data

Dec. 23, 2022 (JP) ................. 2022-206406

(51) Int. Cl.
*B60R 1/23* (2022.01)
*B60R 1/29* (2022.01)

(52) U.S. Cl.
CPC ................. *B60R 1/23* (2022.01); *B60R 1/29* (2022.01); *B60R 2300/301* (2013.01); *B60R 2300/303* (2013.01); *B60R 2300/8006* (2013.01); *B60R 2300/804* (2013.01); *B60R 2300/8086* (2013.01)

(58) Field of Classification Search
None
See application file for complete search history.

(56) References Cited

U.S. PATENT DOCUMENTS

| 7,741,961 | B1 * | 6/2010 | Rafii | G06T 7/70 |
| | | | | 348/148 |
| 2007/0070197 | A1 | 3/2007 | Akatsuka | |
| 2015/0334301 | A1 * | 11/2015 | He | G06T 3/4038 |
| | | | | 348/36 |

* cited by examiner

*Primary Examiner* — Rebecca A Volentine
(74) *Attorney, Agent, or Firm* — Tucker Ellis LLP

(57) ABSTRACT

A display control device includes an image acquisition unit for acquiring an image capturing surrounding of a vehicle; an inclination information acquiring unit that acquires information about an angle of a road surface captured in the image relative to the inclination of the vehicle; a viewpoint detecting unit that acquires information related to eye position of an occupant; a reference plane setting unit that sets an angle of a reference plane as a reference for conversion of the image so that an image of the surroundings of the vehicle is displayed as seen from the eye position of the occupant; an image processing unit that performs image processing to convert an image of the surroundings of the vehicle into an image of the surroundings of the vehicle as viewed from the eye position of the occupant; and a display processing unit for controlling to display the processed image.

6 Claims, 7 Drawing Sheets

DISPLAY CONTROL DEVICE AND DISPLAY CONTROL METHOD

CROSS-REFERENCE TO RELATED APPLICATION

The present application is based on and claims priority from Japanese patent application No. 2022-206406 filed on Dec. 23, 2022, the disclosure of which is hereby incorporated by reference in its entirety.

FIELD OF THE INVENTION

The present disclosure relates to a display control device and a display control method.

BACKGROUND

A device that displays an image on a display unit such as a display mounted on a vehicle, as if the outside of the vehicle can be seen through the display unit is disclosed (see, for example, Patent Document 1: US2007/0070197A1). The device described in Patent Document 1 sets a reference surface that is horizontal to the ground and a reference surface that is perpendicular to the ground with respect to the position of obstacles detected by a sensor, and performs a coordinate conversion that projects an image taken outside the vehicle from the viewpoint position of the occupant onto the reference surface horizontal to the ground and the reference surface perpendicular to the ground.

SUMMARY

However, if the ground in front of the vehicle is sloped, the image could be distorted and converted when the image is projected onto the reference surface horizontal to the ground and the reference surface perpendicular to the ground. This converted image causes a strange feeling to the occupant.

Therefore, an object of this disclosure is to provide a display control device capable of reducing distortion in the image displayed on the display unit.

In order to achieve the aforementioned object, the display control device of the present disclosure, includes: an image acquisition unit for acquiring an image capturing surrounding of a vehicle; an inclination information acquiring unit that acquires information about an angle of a road surface captured in the image relative to the inclination of the vehicle; a viewpoint detecting unit that acquires information related to eye position of an occupant; a reference plane setting unit that sets an angle of a reference plane as a reference for conversion of the image capturing the surroundings of the vehicle so that an image of the surroundings of the vehicle is displayed as seen from the eye position of the occupant based on an angle of the road surface; an image processing unit that performs image processing to convert an image of the surroundings of the vehicle into an image of the surroundings of the vehicle as viewed from the eye position of the occupant, based on the eye position of the occupant and the reference plane; and a display processing unit for performing control so as to display the processed image on a display unit.

A display control method executed by a control unit of the display control device mounted on a vehicle, the method including: an image acquisition step for acquiring an image in which a periphery of the vehicle is captured; an inclination information acquiring step for acquiring information related to the angle of the road surface captured in the image relative to the inclination of the vehicle; a viewpoint detecting step that acquires information related to the eye position of the occupant; a reference surface setting step that sets an angle of a reference surface as a reference for conversion of the image capturing the surroundings of the vehicle so that an image of the surroundings of the vehicle is displayed as seen from the eye position of the occupant based on the angle of the road surface;
an image processing step that performs image processing to convert an image of the surroundings of the vehicle into an image of the surroundings of the vehicle as viewed from the eye position of the occupant, based on the eye position of the occupant and the reference surface; and
a display processing step for performing control so as to display the processed image on a display unit.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Embodiment 1

Figure 1:
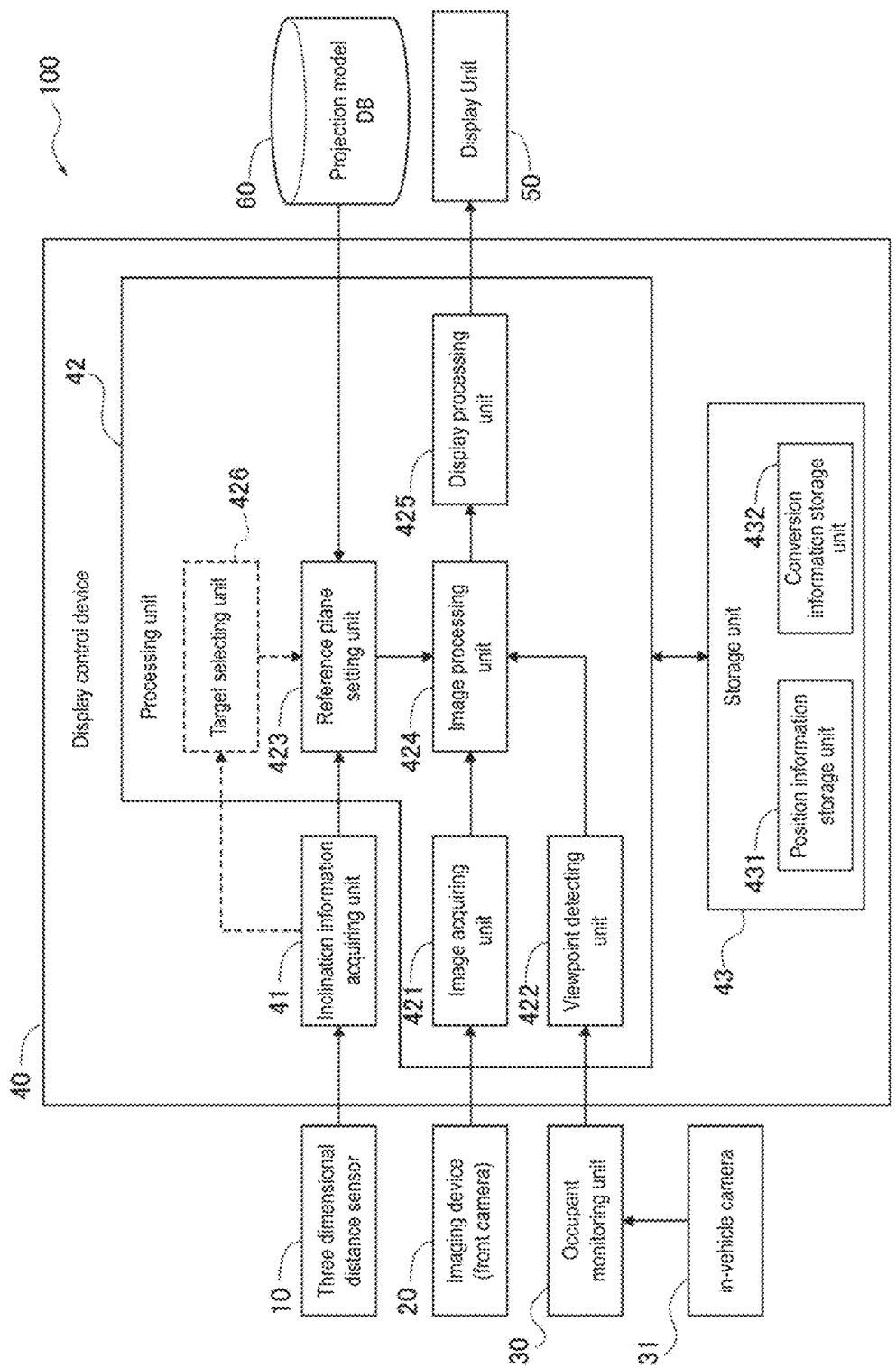
FIG. 1 is a functional block diagram depicting a schematic configuration of a display control system having a display control device according to Embodiment 1.

A display control device according to Embodiment 1 in the present disclosure will be described as follows based on the drawings. FIG. 1 is a functional block diagram depicting a schematic configuration of a display control system 100 having a display control device 40 according to Embodiment 1. The display control device 40 depicted in FIG. 1 is an embodiment of the display control device according to the present disclosure, but the present disclosure is not limited to the present embodiment. The display control device 40 is provided in a moving body such as an automobile or the like. Hereinafter, the moving body on which the display control device 40 of the present embodiment is provided will be referred to and described as the vehicle.

The display control system 100 is equipped with a three-dimensional distance sensor 10, an imaging device 20, an occupant monitoring unit 30, a display control device 40, a display unit 50, and a projection model database 60 (hereinafter referred to as "projection model DB60"). The display control system 100 is a system that converts the image 70 (see FIG. 4, and the like) of the surroundings of the vehicle captured by the imaging device 20 into a display image 52 that appears as if the display unit 50 is transparent when the driver or the like, who is the occupant 1 (see FIG. 2), views the display unit 50 and displays the image on the display unit 50.

Figure 2:
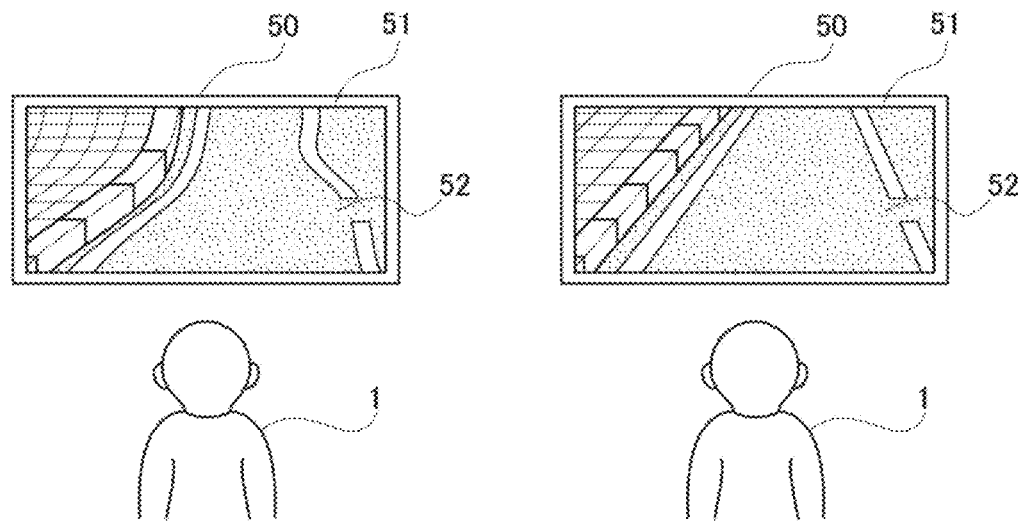
FIG. 2 is an image depicting the image displayed on the display unit using the display image displayed on the display unit and the display control system of the first embodiment, using conventional technology.

The left-hand figure in FIG. 2 is a display image 52 that is displayed on the display region 51 of the display unit 50 using conventional technology when the road surface in front of the vehicle is inclined. The right-hand figure depicts the display image 52 displayed by the display control system 100 of the present embodiment when the road surface in front of the vehicle is inclined. Conventional technology converts the captured image that is projected onto the reference plane horizontal to the ground and the reference plane perpendicular to the ground. Therefore, when there is an incline in front of the vehicle, the displayed image 52 may be distorted and converted, and the occupant 1 viewing the image may feel strangeness. In contrast, the display control system 100 of the present embodiment can reduce distortion of the displayed image 52 by converting the image so as to project the captured image onto the reference plane set to correspond to the forward inclination of the vehicle.

The three-dimensional distance sensor 10 is installed outside the vehicle, acquires three-dimensional information (inclination information) of objects in the surroundings of the vehicle, and outputs the information to the display control device 40. This three-dimensional information is used by the display control device 40 to calculate information about the angle of the road surface. The inclination information is information for acquiring the angle of the road surface in the image captured by the imaging device 20. In other words, the inclination information is information for acquiring the angle of the road surface relative to the inclination of the vehicle (in other words, the ground on which the vehicle is located). For example, the three-dimensional distance sensor 10 is suitably a three-dimensional lidar (LiDAR), but any device capable of acquiring inclination information can be used, and using a three-dimensional lidar is not a requirement.

Figure 3:
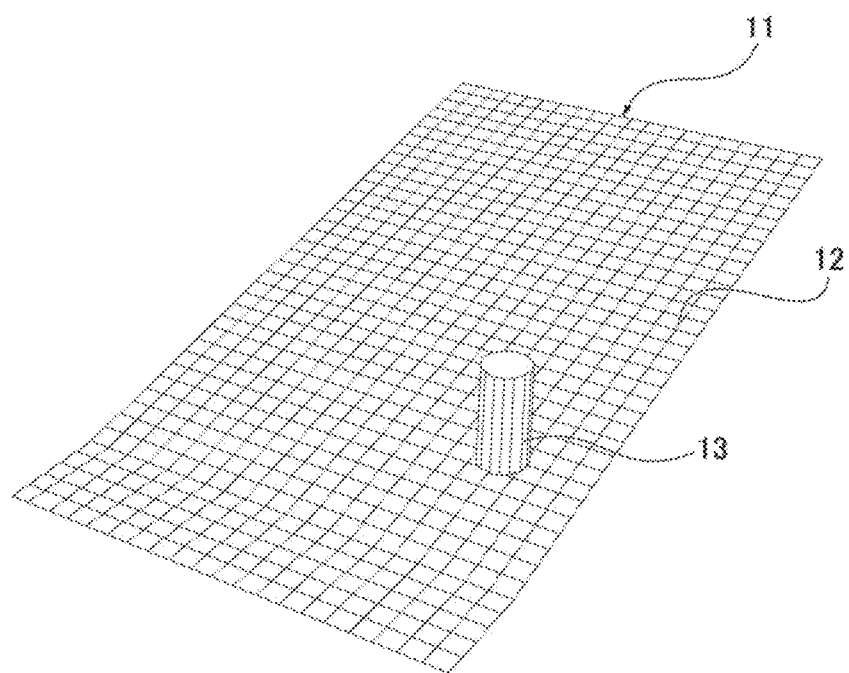
FIG. 3 is an image for describing the inclination information acquired by the inclination information acquiring unit.

The three-dimensional distance sensor 10 of the present embodiment acquires three-dimensional point cloud data 11 such as the road surface of the surroundings of the vehicle or the like, as depicted in FIG. 3, and outputs the information to the display control device 40 as inclination information. The three-dimensional point cloud data 11 depicted in FIG. 3 depicts the three-dimensional point cloud data 12 of the road surface and the three-dimensional point cloud data 13 of objects (obstacles) present on the road surface. It can be seen from the three-dimensional point cloud data 12 of the road surface that the road surface in front of the vehicle is uphill.

The imaging device 20 is installed outside the vehicle and captures an image of the surroundings of the vehicle. The imaging device 20 outputs the captured image 70 to the display control device 40 in accordance with a prescribed protocol. The imaging device 20 includes a front camera installed in the front of the vehicle in the present embodiment. Note that the imaging device 20 is not limited to the front camera, but can also include a rear camera installed in the back of the vehicle, side cameras installed in the front and back of the vehicle on left and right sides, and side cameras installed in the front and back of the vehicle on left and right sides, and the like.

The occupant monitoring unit 30 is provided in the vehicle. The occupant monitoring unit 30 monitors the status of the driver, who is the occupant 1, based on an image captured by an in-vehicle camera 31. The occupant monitoring unit 30 can be any known type of monitoring unit. The in-vehicle camera 31 is a camera that captures an image of the interior of the vehicle, including the driver, and is installed toward the vehicle interior in the vicinity of the display unit 50, for example. Furthermore, the occupant monitoring unit 30 detects the eye position of the occupant 1 using a known technique based on the image captured by the in-vehicle camera 31 and outputs information related to the acquired eye position (hereinafter referred to as "eye position information") to the display control device 40. The eye position information can be, for example, three-dimensional coordinates of the midpoint of the left and right eyes, or the three-dimensional coordinates of the dominant eye of the occupant 1.

The display control device 40 is an information processing device that executes a process related to the creation and display of the display image 52 displayed on the display unit 50 and includes an inclination information acquiring unit 41, a processing unit (control unit) 42, and a storage unit 43, as depicted in FIG. 1. The display control device 40 is configured of, for example, an ECU having a CPU, GPU, RAM, and ROM or other storage device. The processing unit 42 is primarily configured of a CPU or the like included in the ECU and controls an overall operation of the display control device 40 by deploying a prescribed program stored in ROM to RAM and executing the program. The storage unit 43 is primarily configured of the storage device included in the ECU but can include an externally provided server or database.

The display control device 40 can be configured of a single ECU, or can be configured of a plurality of ECUs, distributing each function of the processing unit 42 described later, or distributing the data to be stored. A portion or all of the functions of the display control device 40 can be performed using hardware such as FPGA, ASIC, or the like. A single ECU can be configured to have not only a function of the display control device 40, but also functions of a camera ECU that controls the imaging device 20 and the occupant monitoring unit 30.

The inclination information acquiring unit 41 is an input interface that provides a hard environment for connecting the three-dimensional distance sensor 10 and the display control device 40 in accordance with a predefined protocol. The inclination information acquiring unit 41 acquires three-dimensional point cloud data in front of the vehicle from the three-dimensional distance sensor 10 and outputs the information as inclination information to the reference plane setting unit 423 of the processing unit 42.

The processing unit 42 controls the entire display control device 40 and generates a display image 52 that is displayed on the display unit 50 based on the three-dimensional point cloud data 11 input from the inclination information acquiring unit 41, the captured image 70 input from the imaging device 20, and the eye position information input from the occupant monitoring unit 30. The processing unit 42 functions as the image acquiring unit 421, viewpoint detecting unit 422, reference plane setting unit 423, image processing unit 424, and display processing unit 425, as shown by the solid lines in FIG. 1, but this configuration is not a limitation.

The image acquiring unit 421 acquires the image 70 capturing the surroundings of the vehicle from the imaging device 20, performs predetermined processing as necessary, and outputs the image to the image processing unit 424. The viewpoint detecting unit 422 obtains eye position information from the occupant monitoring unit 30, performs predetermined processing as necessary, and outputs the information to the image processing unit 424.

In the present embodiment, the image acquiring unit 421 and viewpoint detecting unit 422 are provided in the processing unit 42 and acquire the respective information through a known input interface provided by the display control device 40. However, this configuration is not a limitation, and the image acquiring unit 421 and viewpoint detecting unit 422 may be the input interface itself, or may simply output the information acquired from the imaging device 20 or the occupant monitoring unit 30 to the reference plane setting unit 423 and the image processing unit 424, and the required processing for the information may be performed by the reference plane setting unit 423 and the image processing unit 424.

The reference plane setting unit 423 calculates the angle of the road surface using known methods, based on the three-dimensional point cloud data 11 input from the inclination information acquiring unit 41. In other words, the reference plane setting unit 423 also functions as the inclination information acquiring unit to acquire the angle of the road surface captured in the image 70 relative to the inclination of the vehicle. When the angle of the road surface is greater than a predetermined value (for example, 1°, 5°, or the like), the reference plane setting unit 423 sets this angle as the angle of the reference surface in the reference surface setting process. The reference plane setting unit 423 then accesses the projection model DB60 using this angle as a key to obtain the projection model corresponding to that angle (projection model of the same or equivalent angle).

On the other hand, the reference plane setting unit 423 does not necessarily perform the reference plane setting process when the angle of the road surface is less than a predetermined value because the angle can be considered to be the same (horizontal). In this case, the road surface in front of the vehicle is at roughly the same angle (horizontal) as the road surface where the vehicle is, so the captured image 70 is converted using a horizontal model (ground model) with respect to the vehicle as usual. Furthermore, considering the case where the road surface is downhill (negative angle), the reference plane setting unit 423 can be configured to execute the reference plane setting process when the absolute value of the angle of the road surface is greater than a predetermined value.

The reference plane setting unit 423 sets the acquired projection model to the reference plane model 71 (see FIG. 4 or the like) and outputs the information of this reference plane model 71 to the image processing unit 424. The reference plane model 71 is a reference plane for converting the captured image 70 of the surroundings of the vehicle so that an image of the vehicle's surroundings is displayed as if viewed from the position of the eyes of the occupant 1.

The reference plane model 71 is selected based on the angle of the road surface from a plurality of projection models that are preset and stored in the projection model DB60 for a plurality of various angles of the road surface. The projection model contains a plurality of projection models established for each predetermined angle between a horizontal model, which is horizontal to the vehicle, and a vertical model, which is vertical to the vehicle. Each projection model has the necessary information to transform the captured image 70 based on the coordinate system for the angle and the reference plane defined by that coordinate system.

The image processing unit 424 performs image processing to convert the captured image 70 into an image (display image 52) of the surroundings of the vehicle as viewed from the eye position of the occupant 1 based on the reference plane model 71 from the eye position information of the occupant 1 acquired from the viewpoint detecting unit 422 and the reference plane setting unit 423. More specifically, the image processing unit 424 executes: a first conversion process for converting the coordinates of the captured image 70 from an image coordinate system of the captured image 70 to the coordinate system of the reference plane model 71 (referred to as the "reference plane coordinate system); and a second conversion process for converting the coordinates of the reference plane coordinate system to a display coordinate system, which is the coordinate system of the display unit 50. The image processing unit 424 further performs the correction process and the calculation process of the projection conversion matrix M, the projection region setting process, and the calculation process of the projection conversion matrix N.

The image processing unit 424 corrects lens distortion (e.g., lens distortion aberration, chromatic aberration, and the like) of the imaging device 20 using known techniques with respect to the captured image 70 input from the image acquiring unit 421 as the correction process. Note that the correction process can be configured to be performed by the image acquiring unit 421, and the captured image 70 after correction processing can be output to the image processing unit 424.

As the first conversion process, the image processing unit 424 converts the image coordinate system to the reference plane coordinate system so that the captured image 70 after the correction process is projected onto a reference plane in the reference plane coordinate system. The first conversion process is performed using the projection conversion matrix M, which is calculated in advance by the image processing unit 424 and stored in the conversion information storage unit 432 of the storage unit 43. The projection conversion matrix M is calculated in advance for all projection models existing in the projection model DB60.

Figure 4:
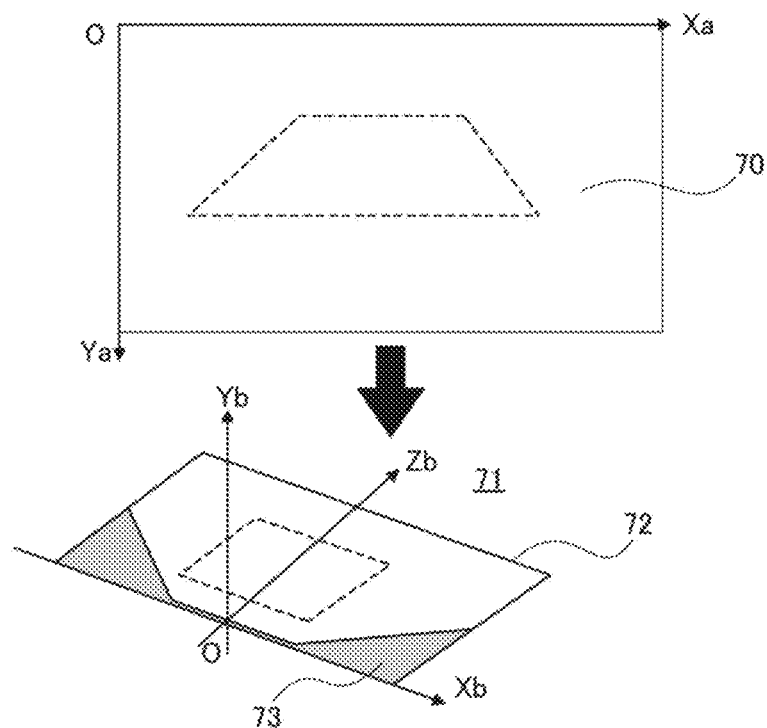
FIG. 4 is a diagram for describing a first conversion process executed by the image processing part.
Figure 5:
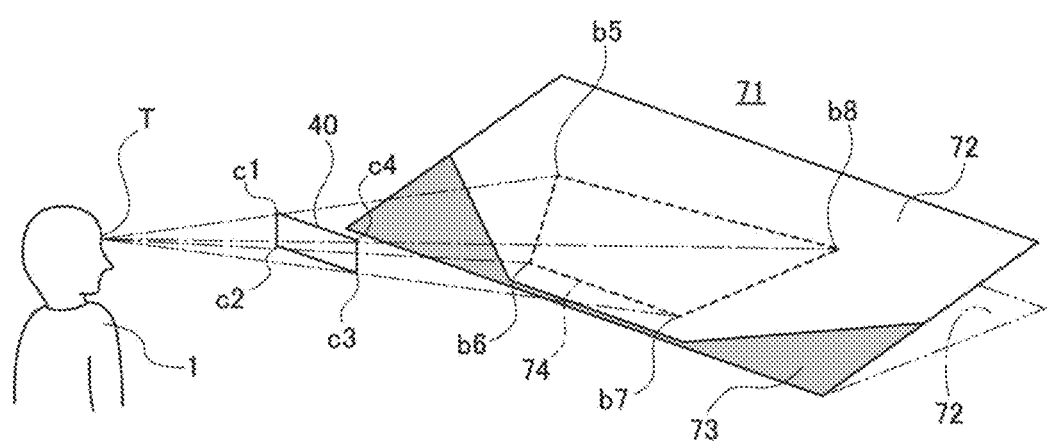
FIG. 5 is a diagram for describing a second conversion process executed by the image processing part.

The first conversion process is described below with reference to FIG. 4 and FIG. 5. The upper figure in FIG. 4 depicts the image coordinate system based on the captured image 70 after the correction process; and the lower figure in FIG. 4 depicts the reference plane coordinate system. The image coordinate system is a two-dimensional coordinate system with the origin O (0, 0) at the upper left corner of the captured image 70 after the correction process. Xa and Ya are mutually orthogonal axes, and the unit of each axis is a pixel (px). The reference coordinate system is a three-dimensional coordinate system with the origin O (0, 0, 0) at a prescribed position of the vehicle. Xb is an axis extending in a vehicle width direction (horizontal direction), Yb is an axis perpendicular to Xb and extending in the vertical direction with regard to the reference plane, and Zb is an axis orthogonal to Xb and Yb and extending in the forward direction of the vehicle and is an axis that extends along the reference plane. The units of the Xb, Yb, and Z axes are mm.

The plane set in the reference plane coordinate system is set in the reference plane model 71 input from the reference plane setting unit 423. Furthermore, the region indicated by a reference numeral 72 in FIG. 5 represents an image in which the captured image 70 is mapped onto the reference plane model 71 by the first conversion process (hereinafter referred to as "mapping image 72"). Furthermore, the region indicated by a reference numeral 73 in FIG. 5 is a region where the captured image 70 is not mapped, in other words, not captured by the imaging device 20 (hereinafter referred to as "non-mapped region 73"). Note that 72 indicating a virtual line in FIG. 5 is the mapping image that is mapped on the ground model corresponding to the road surface with an angle of 0° with regard to the inclination of the vehicle, or in other words the road surface where the vehicle is located, and is illustrated to contrast with the mapping image 72 of the reference plane model 71 which has an angle of inclination.

The image processing unit 424 converts the coordinates of each pixel of the captured image 70 after the correction process into coordinates of the reference model 71 using the following equation (1). In equation (1) below, $x_a$ and $y_a$ represent the x and y coordinates of the image coordinate system, and $x_b$ and $z_b$ represent the x and z coordinates of the reference plane coordinate system. Herein, a indicates homogeneous coordinates representing coordinates $(x_a, y_a)$ in the image coordinate system, and b indicates homogeneous coordinates representing coordinates $(x_b, z_b)$ in the reference plane coordinate system. The relationship between the homogeneous coordinates a and b is expressed by the following equation (1). Note that value $\lambda_b$ indicates the magnification at the homogeneous coordinate b. Regardless of the value of $\lambda_b$ (except for the value 0), the same homogeneous coordinate b represents the same coordinate in the reference plane coordinate system.

$$\begin{pmatrix} \lambda_b x_b \\ \lambda_b z_b \\ \lambda_b \end{pmatrix} = M \begin{pmatrix} x_a \\ y_a \\ 1 \end{pmatrix} \quad (1)$$

Figure 6:
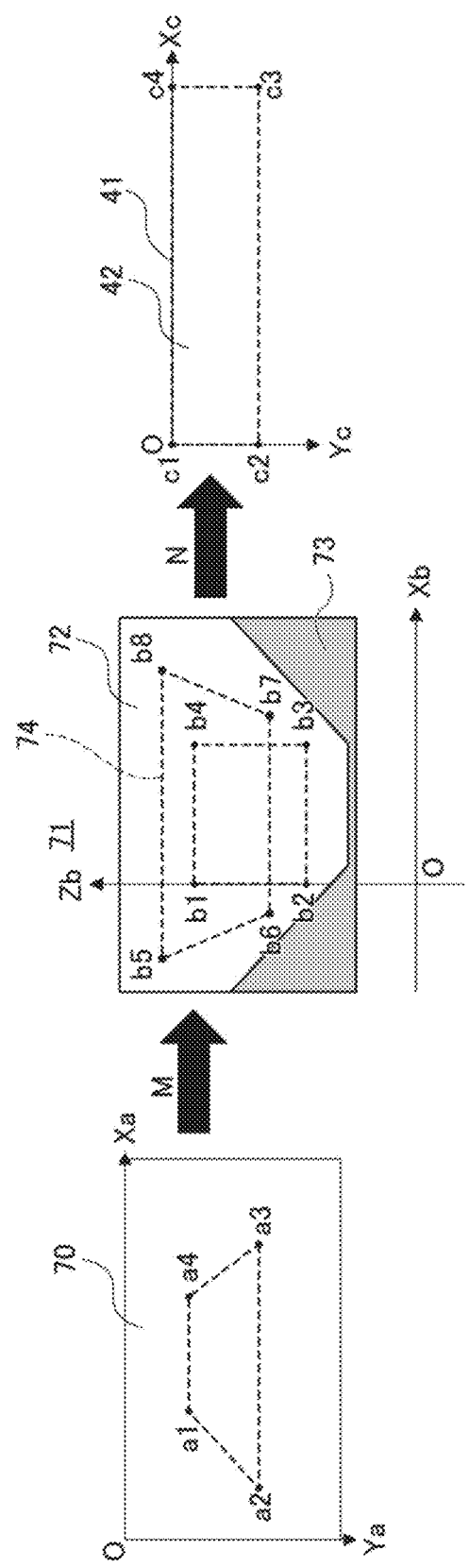
FIG. 6 is a diagram for describing the first conversion process and the second conversion process executed by the image processing part.

The image processing unit 424 performs a calculating process of the projection conversion matrix M in advance. The calculation procedure can be performed as follows with reference to the left and center figures in FIG. 6. a1, a2, a3, and a4 in FIG. 6 are reference points to be referenced in the captured image 70 in the image coordinate system. Furthermore, b1, b2, b3, and b4 depicted in FIG. 6 are reference points corresponding to reference points a1, a2, a3, and a4 in the above image coordinate system, in the reference plane model 71 in the reference plane coordinate system. The relationship between the homogeneous coordinate a representing the coordinates $(x_a, y_a)$ of the image coordinate system and the homogeneous coordinate b representing the coordinates $(x_b, y_b)$ of the reference plane coordinate system can be expressed by the above equation (1).

The image processing unit 424 sets the four reference points b1, b2, b3, and b4 in the reference plane coordinate system, which are points captured on the captured image 70 after the correction process. Furthermore, the coordinates of each of the reference point b1, b2, b3, and b4 are identified by actual measurement and input to the image processing unit 424. Next, the image processing unit 424 identifies the coordinates of the four reference points a1, a2, a3, and a4 in the image coordinate system of the captured image 70 after the correction process.

The image processing unit 424 calculates the projection conversion matrix M by substituting the coordinates of each reference point identified above into the above equation (1) and solving a simultaneous equation involving each element of the projection conversion matrix M. The image processing unit 424 stores the calculated projection conversion matrix M in the conversion information storage unit 432 of the storage unit 43.

The projection region setting process is described below with reference to FIG. 5. The image processing unit 424 calculates the region on the reference plane model 71 (projected region 74) that is projected onto the display region 51 of the display unit 50 when the projected plane is the display unit 50, using the eye position T as a reference, based on the eye position information input from the viewpoint detecting unit 422. The region surrounded by the reference points c1, c2, c3, and c4 depicted in FIG. 5 is the display region 51 of the display unit 50. The position information, or coordinates, of the reference points c1 to c4 are stored in advance in the position information storage unit 431 of the storage unit 43. The region bounded by reference points b5, b6, b7, and b8 on the reference plane model 71 is the projected region 74 that is projected onto the display region 51. The image processing part 424 calculates the coordinates of points b5 to b8 based on the coordinates of the eye position T and the coordinates of points c1 to c4 acquired from the position information storage unit 431.

More specifically, the image processing unit 424 uses the coordinates T (Tx, Ty, Tz) of the eye position T and the coordinates of reference points c1 to c4 at the four corners of the display region 51 to set straight lines (virtual line reference in FIG. 5) connecting the eye position T and reference points c1 to c4. Next, the image processing unit 424 detects the intersections b5 to b8 of these lines with the reference plane model 71, identifies the region surrounded by the intersections (reference points) b5 to b8 as the projection region 74 corresponding to the display region 51, and calculates the coordinates of each intersection b5 to b8.

The calculation process of the projection conversion matrix N is described below, with reference to the center and right-hand drawings in FIG. 6. The right-hand drawing in FIG. 6 is a display coordinate system based on the display region 51 of the display unit 50. The display coordinate system is a two-dimensional coordinate system with the origin O (0, 0) at the upper left corner of the display region 51. Xc and Yc are mutually orthogonal axes, and the unit of each axis is a pixel (px).

In the reference plane model 71 in the reference plane coordinate system, the region surrounded by the reference points b5, b6, b7, and b8 is the projection region 74, and b indicates the homogeneous coordinates representing the coordinates $(x_b, z_b)$ of the reference plane coordinate system. c1, c2, c3, and c4 are the reference points corresponding to each reference point b5, b6, b7, and b8 of the reference plane coordinate system in the display coordinate system of the display unit 50, and c indicates the homogeneous coordinates representing the coordinates $(x_c, y_c)$ of the display coordinate system. The relationship between the homogeneous coordinates b and c is expressed by the following equation (2). Note that value $\lambda_c$ indicates the magnification at the homogeneous coordinate c. Regardless of the value of $\lambda_c$ (except for the value 0), the same homogeneous coordinate c represents the same coordinate in the display coordinate system.

$$\begin{pmatrix} \lambda_c x_c \\ \lambda_c y_c \\ \lambda_c \end{pmatrix} = N \begin{pmatrix} \lambda_b x_b \\ \lambda_b z_b \\ \lambda_b \end{pmatrix} \quad (2)$$

The image processing unit 424 calculates the projection conversion matrix N by substituting the coordinates of the reference points c1 to c4 of the display coordinate system of the display unit 50 and the coordinates of the reference points b5 to b8 of the reference plane coordinate system, calculated in the projection region setting process, into the above equation (2) and solving a simultaneous equation involving each element of the projection conversion matrix N. The image processing unit 424 stores the calculated projection conversion matrix N in the conversion information storage unit 432 of the storage unit 43.

Furthermore, the image processing unit 424 converts the coordinates of the projection region 74 into the display coordinate system by substituting the coordinates of each point of the projection region 74 of the mapping image 72 corresponding to each pixel of the display region 51 into the above equation (2), using the projection conversion matrix N calculated in the above calculation process as the second conversion process. Thereby, the image processing unit 424 generates image data for the display image 52 corresponding to the image of the projection region 74 on the mapping image 72. The image processing unit 424 outputs the generated image data to the display processing unit 425.

Based on the image data input from the image processing unit 424, the display processing unit 425 displays the display image 52 corresponding to the image data on the display region 51 of the display unit 50.

The storage unit 43 temporarily or non-temporarily stores a control program for operating the display control device 40 and various data and parameters used in various operations in the processing unit 42. Furthermore, as described above, the position information storage unit 431 of the storage unit 43 temporarily or non-temporarily stores the coordinates of the reference points c1 to c4 at the four corners of the display region 51. The conversion information storage unit 432 of the storage unit 43 temporarily or non-temporarily stores the projection conversion matrix M and the projection conversion matrix N used in the first conversion process and the second conversion process.

The projection model DB60 stores a plurality of projection models with various angles in advance, as described above. The projection model DB60 is a database provided outside the display control device 40 in the present embodiment, but this is not a limitation, and rather can be provided in the storage unit 43 of the display control unit 40.

Figure 7:
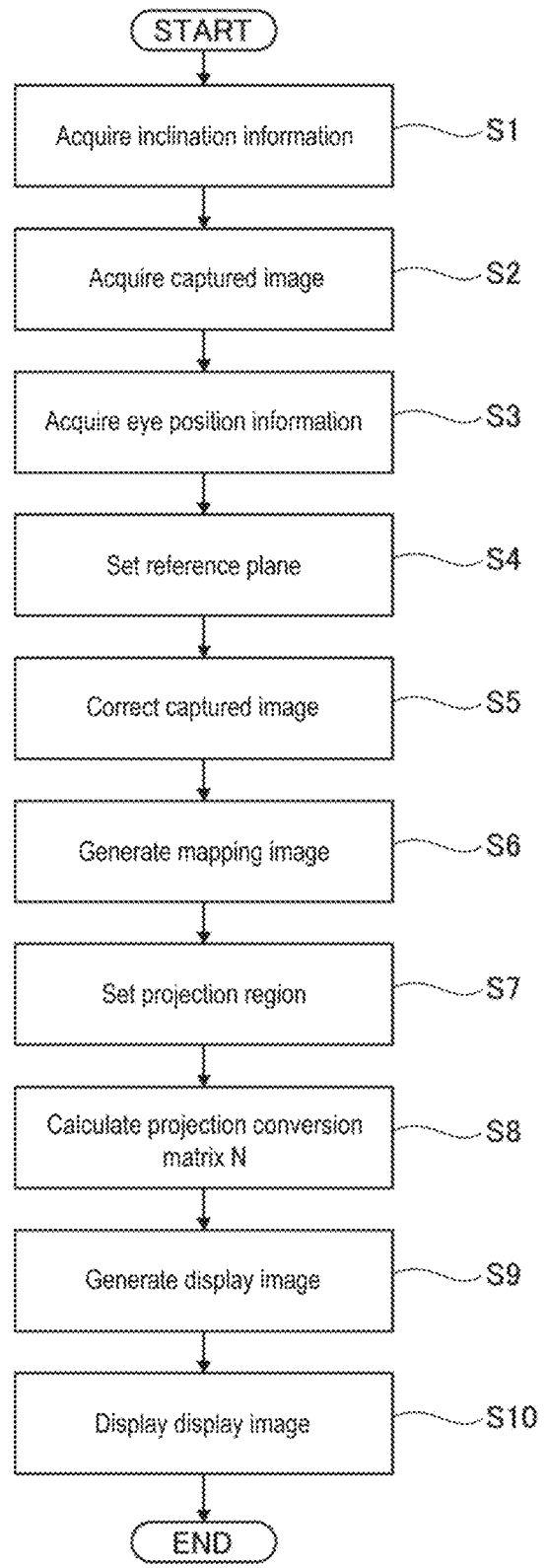
FIG. 7 is a flowchart for describing an example of an operation of the display control device according to Embodiment 1.

An example of an operation of the display control system 100 according to Embodiment 1 with the configuration described above is described below, with reference to the flowchart in FIG. 7. FIG. 7 depicts an example of the operation of the display control device 40, but the operation of the display control device 40 is not limited to the operation in FIG. 7. Furthermore, the steps depicted in FIG. 7 are not always executed in the order depicted in FIG. 7, and the order can be changed as needed, or a plurality of steps can be executed simultaneously.

In Step S1, the inclination information acquiring unit 41 acquires three-dimensional point cloud data 11 which is the inclination information from the three-dimensional distance sensor 10 and outputs the information to the reference plane setting unit 423. On the other hand, in step S2, the image acquiring unit 421 acquires the captured image 70 captured from the imaging device 20 and outputs the image to the image processing unit 424. Furthermore, in Step S3, the viewpoint detecting unit 422 acquires eye position information of the occupant 1 from the occupant monitoring unit 30 and outputs the information to the image processing unit 424.

In the next Step S4, the reference plane setting unit 423 calculates the angle of the road surface based on the three-dimensional point cloud data 11 input from the inclination information acquiring unit 41 and sets the angle of the reference plane. The reference plane setting unit 423 accesses the projection model DB60 to acquire the corresponding projection model based on the angle of this reference plane, sets the reference plane model 71, and outputs to the image processing unit 424. The image processing unit 424 sets the projection conversion matrix M based on the reference plane model 71 that was input.

In the subsequent step S5, the image processing unit 424 performs the correction process to correct lens distortion with respect to the captured image 70. In the subsequent Step S6, the image processing unit 424 generates a mapping image 72 by converting the coordinates of the captured image 70 after the correction process to the coordinates of the reference plane coordinate system using the projection conversion matrix M acquired from the conversion information storage unit 432 and the aforementioned equation (1).

In the subsequent step S7, the image processing unit 424 sets the projection region 74 on the mapping image 72 projected onto the display region 51 of the display unit 50 corresponding to the reference plane model 71 that was set, based on the eye position T input from the viewpoint detecting unit 422. In other words, the image processing unit 424 calculates the coordinates of reference points b5 to b8 surrounding the projection region 74 based on the coordinates of the eye position T, the coordinates of reference points c1 to c4 at the four corners of the display region 51 stored in the position information storage unit 431, and the reference plane model 71 that was set. Next, in step S8, the image processing unit 424 calculates the projection conversion matrix N by substituting the coordinates of reference points c1 to c4 in the display coordinate system and the coordinates of the reference points b5 to b8 in the reference plane coordinate system into the aforementioned equation (2).

In the subsequent step S9, the image processing unit 424 substitutes each coordinate of the projection region 74 into the aforementioned equation (2) and converts the coordinates to coordinates of the display coordinate system, thereby generating image data of the display image 52 to be displayed in the display region 51 and outputting the data to the display processing unit 425.

In Step S10, based on the image data input from the image processing unit 424, the display processing unit 425 displays the display image 52 corresponding to the image data on the display region 51. As a result, the display image 52 with appropriately reduced distortion is displayed in the display region 51, as depicted in the right-hand figure in FIG. 2.

Embodiment 2

The display control device 40 and display control system 100 of the second embodiment of this disclosure have the same basic configuration as the display control device 40 and the display control system 100 of the first embodiment depicted in FIG. 1, except that the function of the reference plane setting unit 423 is different. Therefore, a detailed description of configurations and functions of the second embodiment that are the same as the first embodiment is omitted. The function of the reference plane setting unit 423 of the second embodiment, which differs from the first embodiment, is described below with reference to FIG. 8.

The reference plane setting unit 423 of the second embodiment calculates the angle of the road surface by limiting the three-dimensional point cloud data 11 input from the inclination information acquiring unit 41 to the three-dimensional point cloud data 11 which corresponds to the region displayed in the display region 51 when viewing the display unit 50 from the eye position T of the occupant 1. The reason for this configuration is so that an image as if viewed from the outside of the vehicle can be displayed through the display unit 50, simply by acquiring the angle for only the region corresponding to the region displayed in the display region 51.

Figure 8:
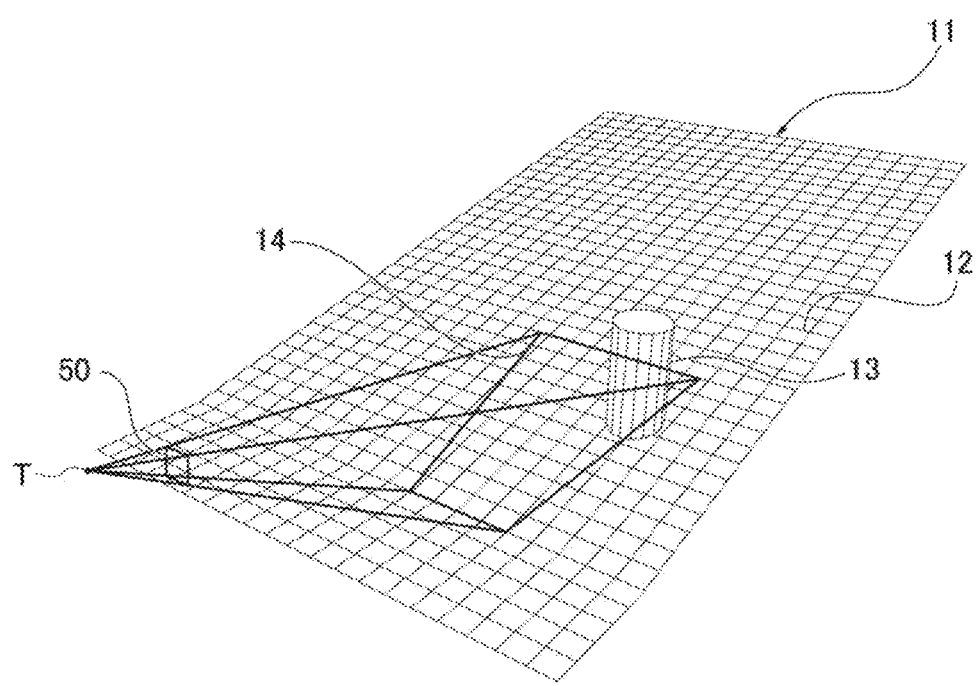
FIG. 8 is a diagram for describing the process executed by the display control device according to Embodiment 2.

The reference numeral 14 depicted in FIG. 8 is the reference region surrounded by the reference points on the three-dimensional point cloud data 11 corresponding to the reference points in the four corners of the display region 51 of the display unit 50. The reference plane setting unit 423 sets the angle of the reference plane based on the three-dimensional point cloud data 11 within this reference region 14. At this time, when the reference plane setting unit 423 detects the three-dimensional point cloud data 13 of an obstacle in the reference region 14, the three-dimensional point cloud data 13 of the obstacle in the reference region 14 is deleted and the angle of the reference plane from only the three-dimensional point cloud data 12 of the road surface is set, in order to avoid obtaining the angle of the obstacle.

The reference plane setting unit 423 accesses the projection model DB60 based on the angle of the reference plane, sets the reference plane model 71, and outputs to the image processing unit 424. Thus, in the second embodiment, the reference plane setting unit 423 can acquire the angle of the road surface in front of the vehicle with higher precision, and the image processing unit 424 can generate a display image 52 with more appropriately reduced distortion.

Embodiment 3

The display control device 40 and display control system 100 of the third embodiment of this disclosure have the same basic configuration as the display control device 40 and the display control system 100 of the first embodiment depicted in FIG. 1, except that the processing unit 42 of the display control device 40 also has a target selecting unit 426 depicted by the broken line in FIG. 1. Therefore, a detailed description of configurations and functions of the third embodiment that are the same as the first embodiment is omitted. The configurations and functions that differ from the first embodiment are described below with reference to FIG. 9.

When both the road surface and the obstacle are captured in the captured image 70, there are cases where the road surface is preferably not distorted, and cases where the obstacle is preferably not distorted in the display image 52 displayed on the display unit 50. Therefore, in the third embodiment, when the angle of the road surface is greater than a predetermined value and there is an obstacle on the road surface, the angle of the reference plane can correspond to either the angle of the road surface or the angle of the obstacle, depending on the distance to the obstacle.

In order to achieve this, in the third embodiment, the inclination information acquisition unit 41 outputs the three-dimensional point cloud data 11 input from the three-dimensional distance sensor 10 to the target selecting unit 426. The target selecting unit 426 calculates the angle of the road surface, the angle of the obstacle, and the distance from the vehicle to the obstacle, based on the three-dimensional point cloud data 11 input from the inclination information acquiring unit 41. In other words, the target selecting unit 426 also functions as the inclination information acquiring unit that acquires the angle of the road surface and the obstacle captured in the captured image 70 relative to the inclination of the vehicle, and an obstacle information acquiring unit that acquires the position of the obstacle.

The target selecting unit 426 determines whether the distance to the obstacle is less than a predetermined value (for example, 1 m, 1.5 m, and the like) as a target selecting process. When the distance to the obstacle is less than a predetermined value (see the top figure in FIG. 9), the target selecting unit 426 sets the angle of the obstacle to the angle of the reference plane. This is because obstacles are very likely to appear in the displayed image 52.

Figure 9:
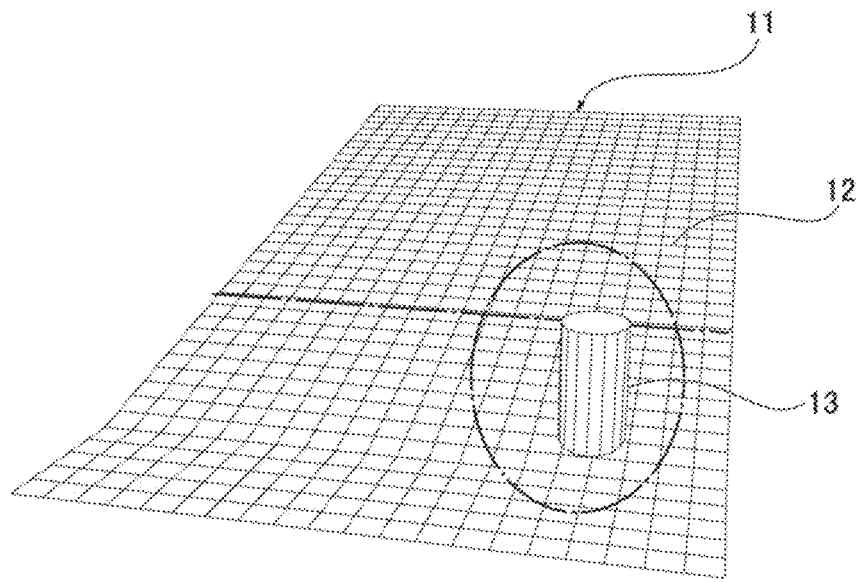
FIG. 9 is a diagram for describing the process executed by the display control device according to Embodiment 3.
Figure 9:
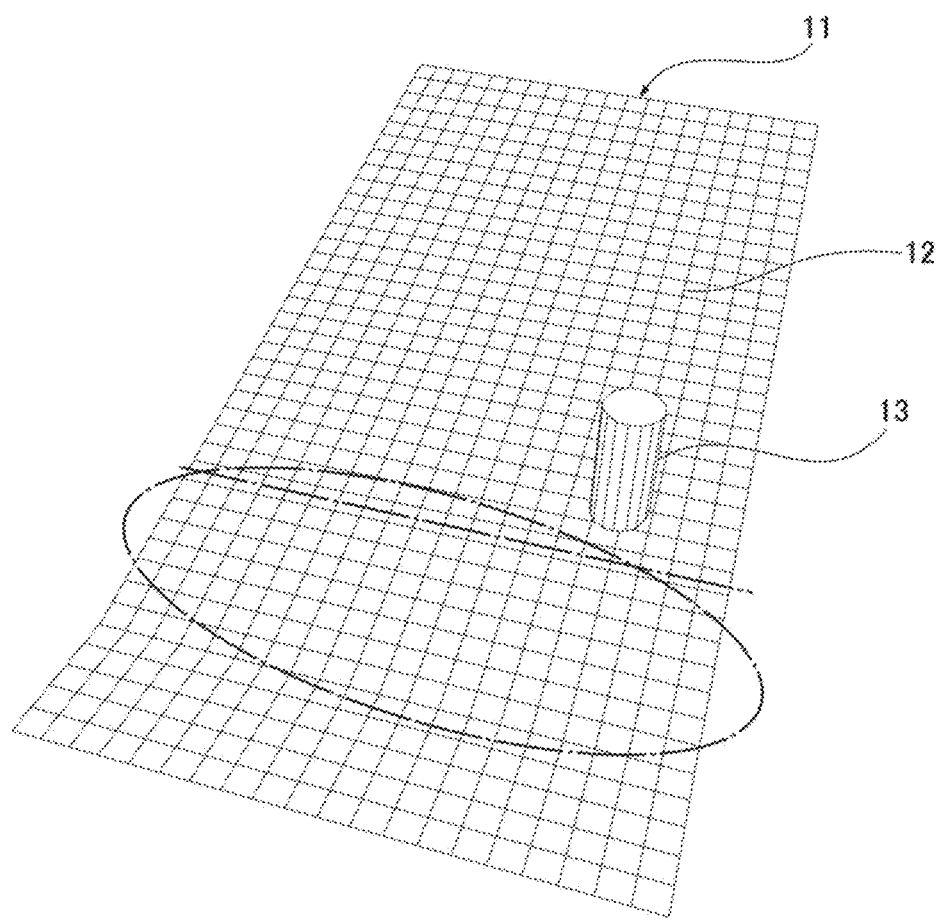

When the distance to the obstacle exceeds a predetermined value (see the bottom figure in FIG. 9), the target selecting unit 426 sets the angle of the road surface to the angle of the reference plane. This is because obstacles are unlikely to appear in the displayed image 52. The top figure in FIG. 9 depicts a state in which the obstacle is detected within the region where the distance indicated by the virtual line is less than a predetermined value. The bottom figure in FIG. 9 depicts a state in which the obstacle is detected at a position farther than the region where the distance indicated by the virtual line is less than a predetermined value. The target selecting unit 426 outputs the angle of the set reference plane to the reference plane setting unit 423.

The reference plane setting unit 423 accesses the projection model DB60 using the angle of the reference plane input from the target selecting unit 426 as a key to acquire the projection model corresponding to the angle of this reference plane, sets the reference plane model 71, and outputs to the image processing unit 424. With the above process, the image processing unit 424 generates image data corresponding to the angle of the road surface or the image data corresponding to the angle of the obstacle, based on the distance to the obstacle, and outputs the image data to the display processing unit 425. The display processing unit 425 displays the display image 52 based on the input image data on the display unit 50.

If the obstacle is relatively far away, the display unit 50 will display a display image 52 with reduced distortion of the road surface, allowing the occupant 1 to better understand the condition of the road surface. On the other hand, if the obstacle is relatively close to the vehicle, the display unit 50 displays a display image 52 with reduced distortion of the obstacle, thus allowing the occupant 1 to more appropriately grasp the presence of the obstacle and the distance to the obstacle, and more suitably perform avoidance maneuvers, or the like.

As described above, the display control device 40 of each of the above embodiments converts the captured image 70 of the vehicle surroundings into an image of the vehicle surroundings viewed from the eye position T of the occupant, based on the reference plane model 71 set based on the eye position T of the occupant and the angle of the road surface in front of the vehicle. This allows the display control unit 40 to reduce distortion of the display image 52 that is displayed on the display unit 50. Furthermore, the display image 52 has an appropriate connection with scenery viewed through a front window. Therefore, even if there is an incline in front of the vehicle, the occupant 1 can view the displayed image 52 without a feeling of strangeness.

The reference plane setting unit 423 of each of the above embodiments can be configured to set the angle of the reference plane to the angle of the road surface relative to the vehicle when the angle of the road surface is greater than a predetermined value. This configuration allows the display control unit 40 to perform the processing described above only when the road surface is inclined at an angle greater than the prescribed value, making the calculation process faster and more efficient.

The display control unit 40 of the third embodiment is equipped with an obstacle information acquiring unit (inclination information acquiring unit 41, target selecting unit 426) that acquires the position of the obstacle, and a target selecting unit 426 that determines whether to adjust the angle of the reference plane to the angle of the road surface or to the angle of the obstacle, based on the distance to the obstacle when the angle of the road surface is above a predetermined value and an obstacle is on the road surface. The reference plane setting unit 423 sets the angle of the reference plane based on the selected angle. Therefore, the display control unit 40 of the third embodiment presents to the occupant 1 a display image 52 with more reduced distortion of the road surface or a display image 52 with more reduced distortion of the obstacle, depending on the presence and distance of obstacles. By viewing the display image 52, the occupant 1 can grasp the condition of the road surface without being affected by obstacles in the distance or obstacles within view.

An embodiment of the present disclosure has been described in detail with reference to the drawings, but the specific configuration is not limited to this embodiment and design changes to a degree that do not deviate from the gist of the present disclosure are included in the present disclosure.

For example, the display control unit 40 in each of the above embodiments converts the captured image 70 captured by the front camera of the imaging device 20 into the display image 52 corresponding to the angle of the road surface in front of the vehicle and the angle of the obstacle, and displays the image on the display unit 50, but the present invention is not limited to this configuration. Instead of or in addition to this configuration, the display control unit 40 can be configured to convert the image captured by the rear camera into a display image corresponding to the angle of the road surface and obstacles behind the vehicle, and display the image on the display unit 50. The display control unit 40 can be configured to convert the image captured by the side camera into a display image corresponding to the angle of the road surface and obstacles at a forward angle to the vehicle, and display the image on the display unit provided on the so-called A pillar. This allows the display control unit 40 to reduce distortion of the rearward and sideward captured images and to display the images on the display unit 50, so that the occupant 1 can more appropriately grasp the road surface and obstacles in the rearward and sideward directions without a feeling of strangeness.

What is claimed is:

1. A display control device, comprising:
    an image acquisition unit for acquiring an image capturing surrounding of a vehicle;
    an inclination information acquiring unit that acquires information about an angle of a road surface captured in the image relative to the inclination of the vehicle;
    a viewpoint detecting unit that acquires information related to eye position of an occupant;
    a reference plane setting unit that sets an angle of a reference plane as a reference for conversion of the image capturing the surroundings of the vehicle so that an image of the surroundings of the vehicle is displayed as seen from the eye position of the occupant based on an angle of the road surface;
    an image processing unit that performs image processing to convert an image of the surroundings of the vehicle into an image of the surroundings of the vehicle as viewed from the eye position of the occupant, based on the eye position of the occupant and the reference plane; and
    a display processing unit for performing control so as to display the processed image on a display unit.

2. The display control device according to claim 1, wherein the reference plane setting unit sets the angle of the reference plane at the angle of the road surface relative to the vehicle when the angle of the road surface is greater than a predetermined value.

3. The display control device according to claim 1, further comprising:
    an obstacle information acquiring unit that acquires a location of an obstacle; and
    a target selecting unit that determines whether the angle of the reference plane based on the distance to the obstacle matches the angle of the road surface, or matches the angle of the obstacle, when the angle of the road surface exceeds a prescribed value.

4. A display control method executed by a control unit of a display control device mounted on a vehicle, comprising:
    an image acquisition step for acquiring an image in which a periphery of the vehicle is captured;
    an inclination information acquiring step for acquiring information related to the angle of the road surface captured in the image relative to the inclination of the vehicle;
    a viewpoint detecting step that acquires information related to the eye position of the occupant;
    a reference surface setting step that sets an angle of a reference surface as a reference for conversion of the image capturing the surroundings of the vehicle so that an image of the surroundings of the vehicle is displayed as seen from the eye position of the occupant based on the angle of the road surface;
    an image processing step that performs image processing to convert an image of the surroundings of the vehicle into an image of the surroundings of the vehicle as viewed from the eye position of the occupant, based on the eye position of the occupant and the reference surface; and
    a display processing step for performing control so as to display the processed image on a display unit.

5. The method according to claim 4, wherein the reference plane setting step sets the angle of the reference plane at the angle of the road surface relative to the vehicle when the angle of the road surface is greater than a predetermined value.

6. The method according to claim 4, further comprising:
    an obstacle information acquiring step that acquires a location of an obstacle; and
    a target selecting step that determines whether the angle of the reference plane based on the distance to the obstacle matches the angle of the road surface, or matches the angle of the obstacle, when the angle of the road surface exceeds a prescribed value.

* * * * *